(12) United States Patent
Yang et al.

(10) Patent No.: US 7,574,194 B2
(45) Date of Patent: Aug. 11, 2009

(54) EMERGENCY CALL SYSTEM AND CONTROL METHOD THEREOF

(75) Inventors: Sung-Chul Yang, Suwon-si (KR); Hwan-Seog Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 189 days.

(21) Appl. No.: 11/071,756

(22) Filed: Mar. 3, 2005

(65) Prior Publication Data

US 2005/0197096 A1  Sep. 8, 2005

(30) Foreign Application Priority Data

Mar. 5, 2004  (KR)  ...................... 10-2004-0015982

(51) Int. Cl.
*H04M 11/04*  (2006.01)
*G08B 1/08*  (2006.01)
(52) U.S. Cl. ............. 455/404.1; 455/404.2; 340/539.18
(58) Field of Classification Search ........................ None
See application file for complete search history.

(56) References Cited

U.S. PATENT DOCUMENTS

| | | | | | |
|---|---|---|---|---|---|
| 5,228,449 | A | * | 7/1993 | Christ et al. ................. | 600/504 |
| 5,661,471 | A | * | 8/1997 | Kotlicki .................. | 340/825.37 |
| 6,141,558 | A | * | 10/2000 | Chen ........................ | 455/456.1 |
| 6,198,914 | B1 | * | 3/2001 | Saegusa .................... | 455/404.2 |
| 6,212,260 | B1 | | 4/2001 | Baum et al. | |
| 6,671,513 | B1 | * | 12/2003 | Frank et al. .............. | 455/456.1 |
| 6,901,255 | B2 | * | 5/2005 | Shostak .................... | 455/422.1 |
| 7,039,425 | B1 | * | 5/2006 | Mazawa et al. .......... | 455/456.4 |
| 2002/0034960 | A1 | * | 3/2002 | Muranaga ................... | 455/517 |
| 2002/0086659 | A1 | * | 7/2002 | Lauper ........................ | 455/404 |
| 2002/0098844 | A1 | * | 7/2002 | Friedenfelds et al. ....... | 455/445 |
| 2002/0098874 | A1 | * | 7/2002 | Zirul et al. .................. | 455/564 |

FOREIGN PATENT DOCUMENTS

| | | |
|---|---|---|
| JP | 10-229455 | 8/1998 |
| JP | 2001-319283 | 11/2001 |
| JP | 2001-339536 | 12/2001 |
| JP | 2003-087436 | 3/2003 |
| JP | 2004-040733 | 2/2004 |
| KR | 1020020005070 | 1/2002 |
| KR | 10-2002-0037412 | 5/2002 |
| KR | 10-0379946 | 3/2003 |
| KR | 10-2005-0020160 | 3/2005 |

\* cited by examiner

*Primary Examiner*—Nick Corsaro
*Assistant Examiner*—Joel Ajayi
(74) *Attorney, Agent, or Firm*—The Farrell Law Firm, LLP (57) ABSTRACT

An emergency call system and a control method thereof are provided for notifying a third party of an emergency situation using a mobile communication terminal. The emergency call system includes a calling terminal, a base station (BS), and a management server. When recognizing the emergency situation of a registered subscriber, the management server notifies an emergency reception center of the emergency situation. The calling terminal generates and transmits first and second emergency messages. The first emergency message includes an emergency notification message, a phone number of at least one called terminal (recipient), and BS identification information, and the second emergency message includes the emergency notification message and the subscriber's phone number. The BS receives the first and second emergency messages, and transfers the received first and second emergency messages to the management server and the at least one called terminal.

23 Claims, 6 Drawing Sheets

EMERGENCY CALL SYSTEM AND CONTROL METHOD THEREOF

PRIORITY

This application claims priority to an application entitled "EMERGENCY CALL SYSTEM AND CONTROL METHOD THEREOF", filed in the Korean Intellectual Property Office on Mar. 5, 2004 and assigned Serial No. 2004-15982, the contents of which are incorporated herein by reference.

BACKGROUND OF THE INVENTION

1. Field of the Invention

The present invention relates generally to a mobile communication system and a call control method thereof, and more particularly to an emergency call system and a control method that can notify a third party of an emergency situation using a mobile communication terminal.

2. Description of the Related Art

When a mobile communication terminal user requires help in an emergency situation (e.g., traffic accident, fire, theft or robbery, etc.), they would normally attempt to call someone directly. Once connected, the user must then state the current situation and location to ask for help. However, if the call connection fails, the user may not get the much-needed help in time because they must find another contact phone number and repeat the call process. When faced with a robbery, it is nearly impossible for the user to perform a call connection to ask for help.

Some mobile communication providers provide a service whereby the user sends an emergency rescue request to the mobile communication carrier, and the mobile communication carrier provides a recipient designated by the user with the user's location or an image of the emergency situation of the user, and connects a call between the user and persons receiving the emergency rescue request. In an emergency, it is difficult for the user to connect a call to many persons.

In an alternative service, a positioning system such as a global positioning system (GPS) receiver is used to report the current situation or location information of the user in a dangerous situation. With this service, the current location of the user is tracked and reported to a recipient, or moving pictures are taken and sent to the recipient. To receive this service, the user must purchase a special mobile communication terminal with GPS and an image capture function. Since the methods used for providing current location information or still/moving pictures are different between mobile communication carriers, a user has to get all his mobile communication services from the same provider to take advantage of the emergency notification system.

In addition, no attempt has been made to provide for linking an emergency notification message to a government agency such as the police or fire department capable of quickly and effectively dealing with the emergency situation.

SUMMARY OF THE INVENTION

Accordingly, the present invention has been designed to solve the above and other problems occurring in the prior art. Therefore, it is an aspect of the present invention to provide an emergency call system and method that can transmit a short message for emergency notification and an emergency rescue request in a one-touch manner when a user of a mobile communication terminal encounters an emergency situation.

It is another aspect of the present invention to provide an emergency call system and a control method thereof that can simultaneously transmit emergency messages to a plurality of recipients.

It is another aspect of the present invention to provide a system and method that can place an emergency call using only a mobile communication terminal regardless of service subscription or a type of service of a mobile communication carrier.

It is another aspect of the present invention to provide an emergency call system and a control method thereof that can accurately and safely identify a current emergency situation of a user when a recipient recognizing the emergency situation attempts a call connection in a state in which the user of a mobile communication terminal making an emergency call cannot perform voice communication.

It is yet another aspect of the present invention to provide an emergency call system and a control method thereof that can automatically link an emergency call to a governmental agency such as an official police or fire agency, etc. capable of coping with an emergency situation when a subscriber in the emergency situation makes the emergency call.

The above and other aspects of the present invention can be achieved by an emergency call system, including at least one called terminal; a management server for notifying an emergency reception center of an emergency situation when recognizing the emergency situation of a registered subscriber; a calling terminal for generating and transmitting first and second emergency messages, wherein the first emergency message includes an emergency notification message, a phone number of the at least one called terminal (recipient), a subscriber's phone number, the subscriber's management server registration identification (ID), and base station (BS) identification information, and the second emergency message includes the emergency notification message, the subscriber's phone number, and the BS identification information; and a BS for receiving the first and second emergency messages, and transferring the received first and second emergency messages to the management server and the at least one called terminal.

The above and other aspects of the present invention can be achieved by a method for controlling an emergency call in an emergency call system including a calling terminal, at least one called terminal, a management server for notifying an emergency reception center of an emergency situation when recognizing the emergency situation of a registered subscriber, and a base station (BS). The method includes generating and transmitting first and second emergency messages when the calling terminal detects an input of an emergency notification key, wherein the first emergency message includes an emergency notification message, a phone number of the at least one called terminal (recipient), the subscriber's phone number, the subscriber's management server registration identification (ID) and BS identification information, and the second emergency message includes the emergency notification message, the subscriber's phone number and the BS identification information; determining operating mode when the BS receives the first and second emergency messages; and transmitting the second emergency message only to the at least one called terminal when the operating mode is designated call mode, and transmitting the first emergency message to the management server when the operating mode is emergency rescue mode.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the drawings, the same or similar elements are denoted by the same reference numerals even though they are depicted in different drawings. In the following description, specific details such as a specific phone number, etc. are shown. The description of the specific details has been made only for a better understanding of the present invention. Those skilled in the art will appreciate that the present invention can be implemented without using the above-mentioned specific details. Additionally, in the following description, a detailed description of known functions and configurations incorporated herein will be omitted for conciseness.

Figure 1:
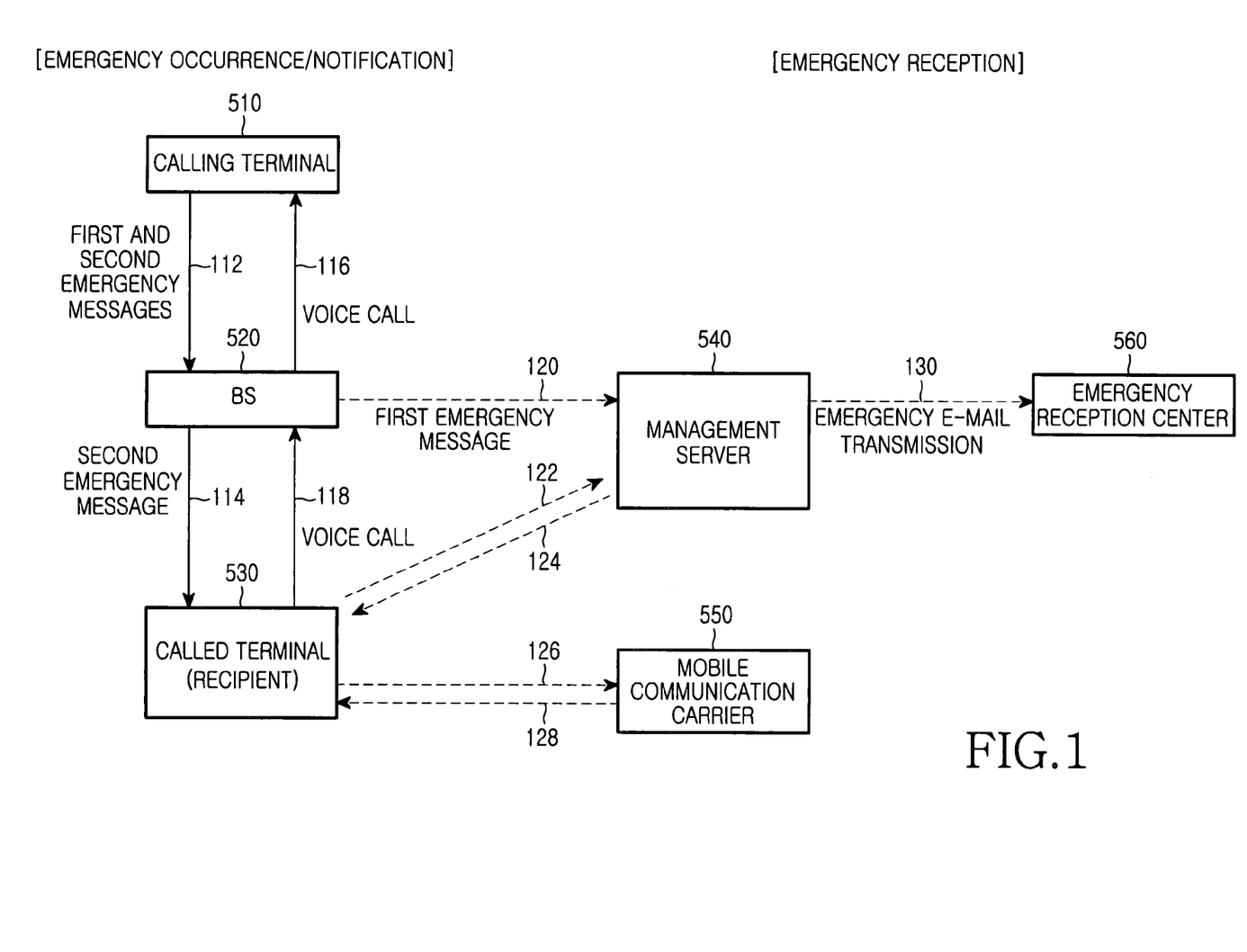
FIG. 1 is a block diagram illustrating an emergency call system in accordance with a preferred embodiment of the present invention.

FIG. 1 is a block diagram illustrating an emergency call system in accordance with a preferred embodiment of the present invention.

When an emergency situation occurs, a subscriber inputs a key for emergency notification (hereinafter, referred to as an "emergency call key") in the terminal 510 of the calling subscriber (hereinafter, referred to as a "calling terminal") in a predetermined manner. The calling terminal 510 generates a short message for emergency notification (hereinafter, referred to as an "emergency message") to transmit the generated short message to a base station (BS) 520 (Operation 112). In this case, first and second emergency messages are automatically generated using stored information from memory (not shown). The information includes a message for emergency notification, a user identification (ID), at least one called terminal phone number (or a list of recipients), serving BS identification information, etc. The user ID is an ID set when the subscriber is registered in an emergency management server 540 (hereinafter, referred to as a "management server").

The BS 520 receives the first and second emergency messages, and transfers them to the management server 540 and a terminal 530 of a called subscriber (hereinafter, a "called terminal"), respectively (Operations 120 and 114). A single called terminal 530 is illustrated in FIG. 1, but a plurality of called terminals may be contacted. In addition, the calling or called terminal may be any portable communication device, including a mobile phone, personal digital assistant (PDA), Blackberry, etc.

When the BS 520 detects a voice call from the called terminal 530 (Operation 118), the voice call is transferred to the calling terminal 510 (Operation 116). The call from the called terminal indicates that the called subscriber, or emergency message recipient, recognizes the emergency situation of the calling subscriber, the user having an emergency, and attempts to contact the user in jeopardy.

A specific phone number for receiving the first emergency message from the subscriber, or the first recipient of the emergency notification message, is assigned to the management server 540. When the management server 540 receives an emergency message, it accurately computes location information of the subscriber using BS identification information, and notifies an emergency reception center 560 and the called party of the computed location information. In addition, a user authentication procedure is performed using a server registration ID. The notification can be implemented by E-mail.

The called subscriber (emergency message recipient) can receive location information of the calling subscriber (user in emergency situation), that is, the calling terminal 510, from the management server 540 or the mobile communication carrier 550 via the called terminal 530. When a request for location information of the calling subscriber is received from the called terminal 530 (Operation 122), the management server 540 computes the location of the calling subscriber on the basis of the BS identification information and provides voice guidance (Operation 124).

Alternatively, the management server 540 computes the location of the called subscriber, marks a map, and then transmits, to the called terminal 530, a uniform resource locator (URL) to download the map, in the form of a short message (Operation 124).

The management server 540 can identify location information by numerous methods. The management server 540 can identify location information by matching the BS identification information included in the emergency message with the location information of its own database, or by employing a database of the mobile communication carrier 550. Because BS identification information is identification information assigned to each BS, the management server 540 or the mobile communication carrier 550, stores geographic information matched with BS identification information in a database to locate a subscriber.

Alternatively, the mobile communication carrier 550 may receive a request for location information of the calling subscriber from the called terminal 530 (Operation 126). When the calling subscriber is registered in a service for providing the location of other mobile communication users, such as a friend finder service, the mobile communication carrier 550 locates the calling subscriber and notifies the called terminal 530 of the calling subscriber's location (Operation 128).

Figure 2:
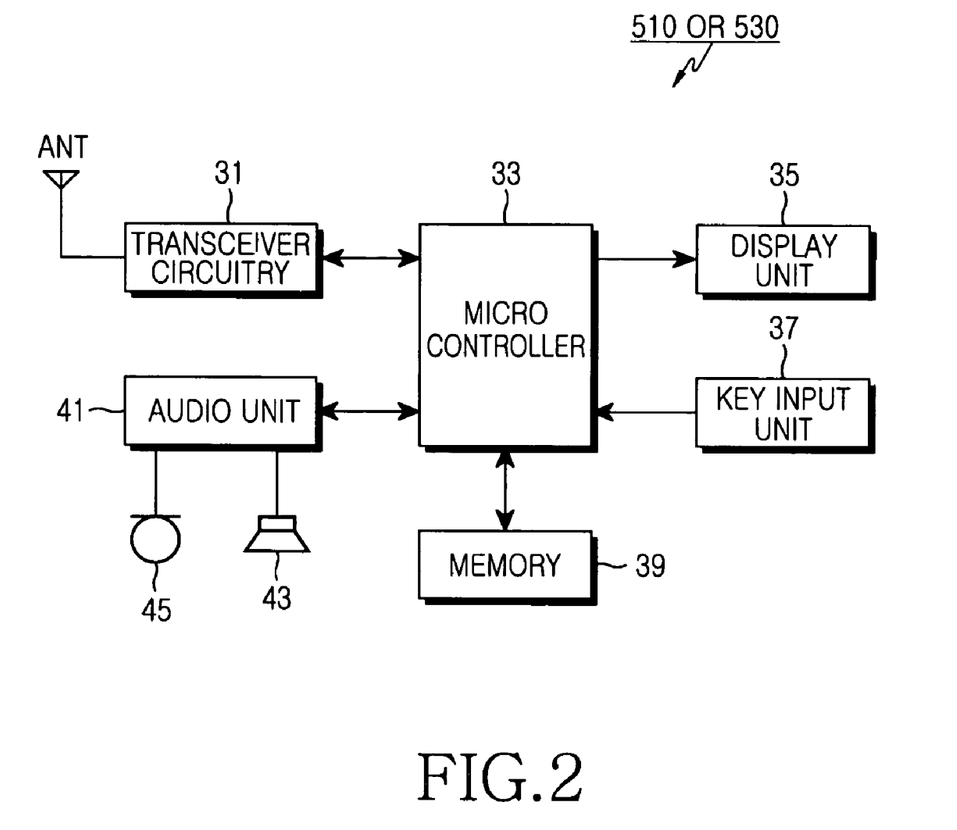
FIG. 2 is a block diagram illustrating a mobile communication terminal for a calling or called terminal in accordance with a preferred embodiment of the present invention.

FIG. 2 is a block diagram illustrating a mobile communication terminal for the calling or called terminal in accordance with a preferred embodiment of the present invention.

The calling terminal 510 is distinguished from the called terminal 530 by their functions as illustrated in FIG. 1. However, the roles may be reversed and are fully interchangeable.

Referring back to FIG. 2, a configuration of the terminal will be described when a call function is performed. Transceiver circuitry 31 transmits, to predetermined recipients, a predetermined message, input in advance by a user or initially input into the terminal. The message is designed and tailored for emergency notification.

A micro controller 33 detects input of an emergency call key and reads an emergency notification message and a recipient list stored in memory 39. The micro controller 33 generates first and second emergency messages using the emergency notification message, the recipient list, BS identification information, and server registration ID. Preferably, the BS identification information is acquired when the terminal communicates with a BS of a mobile communication network.

After the first and second emergency messages are transmitted, the controller 33 switches the terminal to emergency mode. When a voice call connection request is received from an arbitrary recipient, the controller 33 appropriately controls functions of a speaker 43, a microphone 45, and a display unit 35 according to the emergency mode. For example, the controller 33 would reject calls from anyone other than an emergency message recipient.

The memory 39 stores the emergency notification message and programs for controlling operation of the mobile communication terminal. The message can be changed and stored according to user input. More specifically, the memory 39 includes an area capable of storing at least one recipient phone number (the called terminal), a phone number of the management server 540, and the server registration ID. The server registration ID is included in the first emergency message and is transmitted to the management server 540. The management server 540 performs an authentication procedure for the user (or the calling subscriber) on the basis of the server registration ID, and notifies the emergency reception center 560 of the authentication procedure result.

At the direction of the controller 33, the display unit 35 displays an operating state for setting the recipient or displays an operating state for transmitting the emergency message in the form of text. After the emergency message is transmitted, the display unit 35 displays a preset icon to indicate that the mobile communication terminal is operating in the emergency mode. For example, the preset icon indicates a state in which an SOS message is being sent, a confirmation call/reception standby state, etc. Before the END key is input in the emergency mode after the emergency message is transmitted, the backlight of the terminal would not operate to prevent an offender from recognizing the fact that the user sent out an emergency message.

Under control of the controller 33, the speaker 43 is muted, preferably until the END key is input. When a call connection request is received from an emergency message recipient in the emergency mode, the terminal is automatically connected without generating a ring sound.

When a a folder type terminal is closed, the terminal operates in a mute state. When the folder is open, the terminal may operate with sound. Although the speaker 43 is muted, the microphone 45 is not. This allows a party on the other end of a call to identify the emergency situation of the terminal user when a call is connected.

When the call from the emergency message recipient is automatically connected in the emergency mode, the microphone 45 picks up sound and converts the picked-up sound into an electric signal. The opposite party can determine the current situation of the terminal user through the electrical signals when decoded into the original sounds at the recipient's end.

A key input unit 37 is configured with keypad having a plurality of keys, etc. The key input unit 37 includes not only keys used for subscriber setup to perform an emergency call function, but also separate buttons for controlling various functions (associated with a camera, speaker volume, etc.) in the mobile communication terminal. A separate button for an emergency call can be additionally mounted to one side of the mobile communication terminal. A button assigned for a different function may be newly defined and used as the emergency call button. For example, the mobile communication terminal can be defined such that the emergency message can be generated and transmitted when the speaker volume button is pressed for several seconds or more or is consecutively pressed several times (e.g., 4 times).

Now, a function and configuration of the called terminal will be described.

The transceiver circuitry 31 receives the second emergency message from the calling terminal, and receives subscriber location information from the management server 540 or the mobile communication carrier 550. When the second emergency message is received, the controller 33 controls an audio unit 41 to generate a separately set alert sound, unique to the emergency message, regardless of the current operation of the terminal (e.g., a vibration or call connection operation, etc) so that a user of the called terminal can be notified of the fact that the second emergency message has been received. The display unit 35 displays the received second emergency message, the subscriber location information, or both.

FIGS. 3A to 3G illustrate examples of display screens when a calling subscriber performs an emergency call setup process in accordance with a preferred embodiment of the present invention.

Figure 3A:
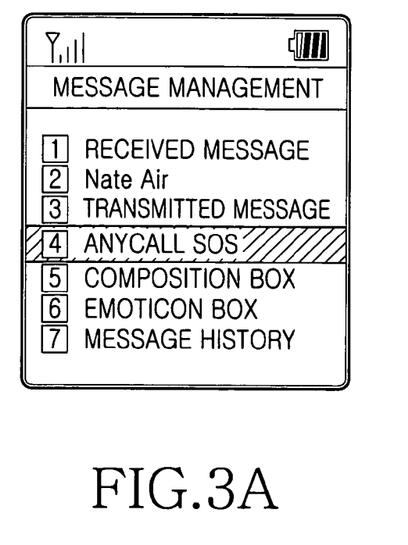
FIGS. 3A to 3G illustrate examples of display screens when a calling subscriber performs an emergency call in accordance with a preferred embodiment of the present invention.

FIG. 3A illustrates a message management menu screen. For example, the term "Anycall SOS" means an emergency call function in accordance with the present invention.

Figure 3B:
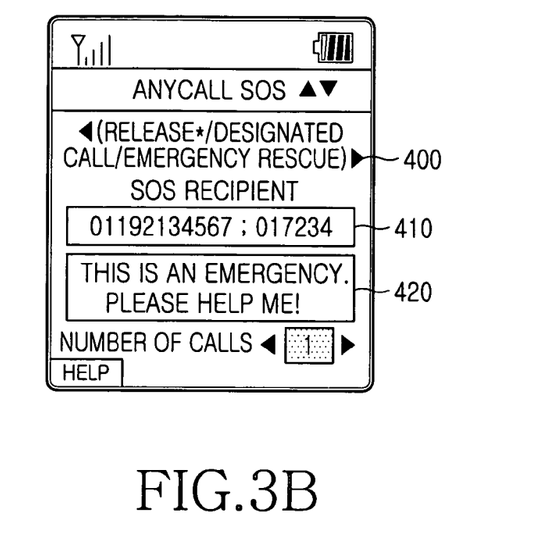

FIG. 3B illustrates a sub-menu screen when the calling subscriber has selected "Anycall SOS" in the screen illustrated in FIG. 3A. As indicated by reference numeral 400, the calling subscriber can set emergency rescue mode or designated call mode. The emergency rescue mode is the operating mode for generating the first and second emergency messages and sending the generated first and second emergency messages to the management server 540 and the called terminal 530. The designated call mode is the operating mode for generating only the second emergency message and sending the generated second emergency message only to the called terminal 530. As illustrated in FIG. 3B, two windows 410 and 420 are open. The window 410 is used to input a recipient phone number, and the window 420 is used to display the designated, predetermined emergency notification message.

The calling subscriber should input at least one recipient phone number according to a priority designated by the subscriber's own criteria. Because the calling subscriber cannot predict the communication network situation when an emergency situation occurs, a plurality of recipient phone numbers may be stored and used in the calling terminal. If an emergency message recipient does not receive the message, for example, when the called terminal is powered off, or the recipient is absent or is engaged in another call, someone will be notified of the emergency because the emergency message is sent to a plurality of stored recipient phone numbers.

On the receiving end, the emergency notification message is automatically displayed. Of course, the calling subscriber can directly input the message content, or can correct the message content.

Figure 3C:
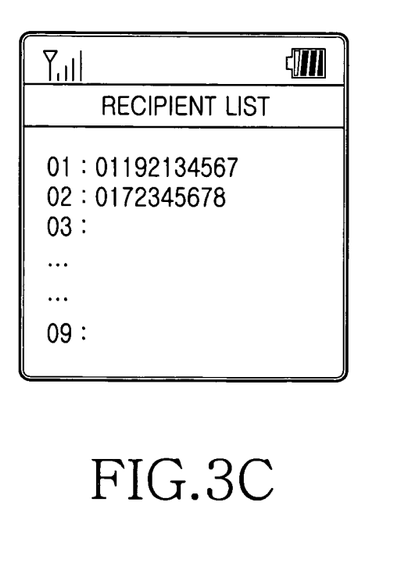

FIG. 3C illustrates a screen for displaying a list of recipients input by the calling subscriber in the screen of FIG. 3B, where the calling subscriber can determine if a recipient phone number is accurately input, and whether a priority needs to be changed. It should be noted that even though the recipient list illustrated in FIG. 3C does not display the management server's 540 phone number, the list does includes the management server as a recipient. The priority level of general recipients should not be higher than that of the management server 540. In addition, the calling terminal can be implemented such that the screen of FIG. 3B is replaced with that of FIG. 3C when the OK key is input after all recipient phone numbers are entered.

Figure 3D:
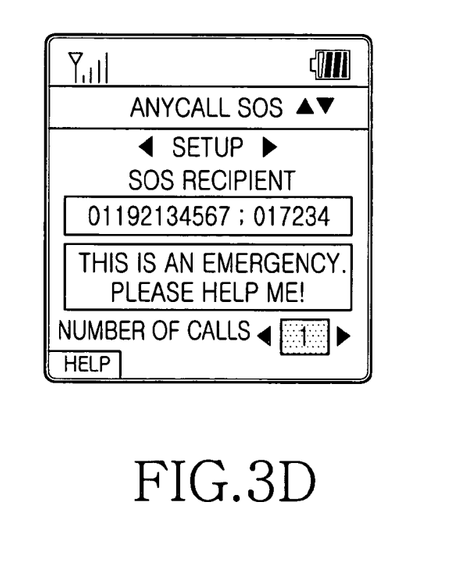

FIG. 3D illustrates a screen for setting the number of emergency notifications. The calling terminal can be implemented such that the screen of FIG. 3D is displayed when the calling subscriber inputs the OK key after identifying input content from the screen of FIG. 3C.

Figure 3E:
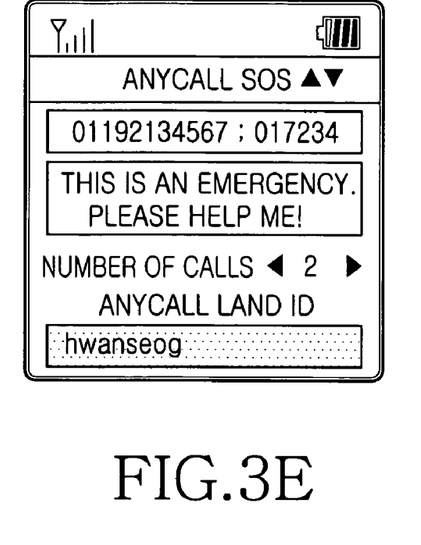

FIG. 3E illustrates a screen for inputting a management server registration ID of the calling subscriber. The calling terminal can be implemented such that the screen of FIG. 3E is displayed when an up-scroll key is input after the number of calls (e.g., 2) is set in the screen of FIG. 3D. For example, "ANYCALL LAND" indicates the management server 540 (e.g., a wireless Internet home page) of the emergency call system in accordance with the present invention.

Figure 3F:
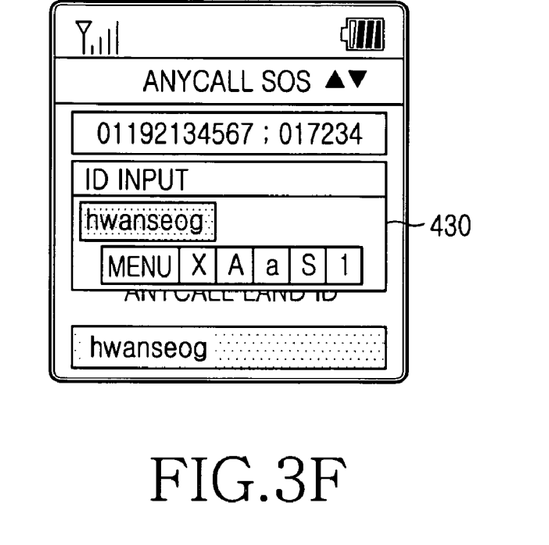

FIG. 3F illustrates a screen for inputting an authentication ID for accessing the management server.

Figure 3G:
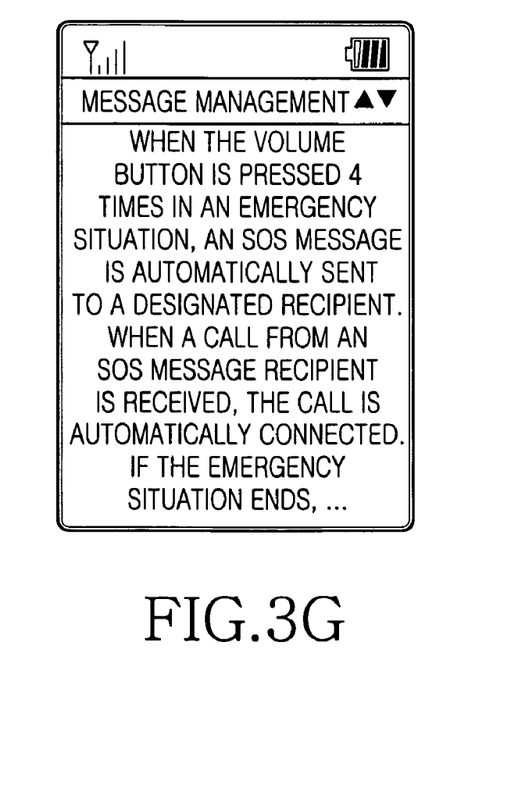

FIG. 3G illustrates a screen for displaying help text when "HELP" is selected in the screen of FIG. 3B or 3D. The help text includes messages indicating how to use the emergency call function.

Figure 4A:
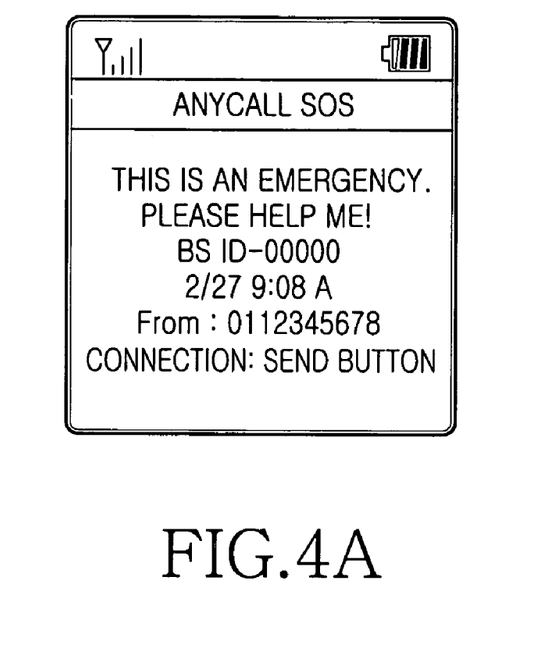
FIGS. 4A and 4B illustrate examples of short messages displayed on a called subscriber terminal when an emergency call is made in accordance with a preferred embodiment of the present invention.
Figure 4B:
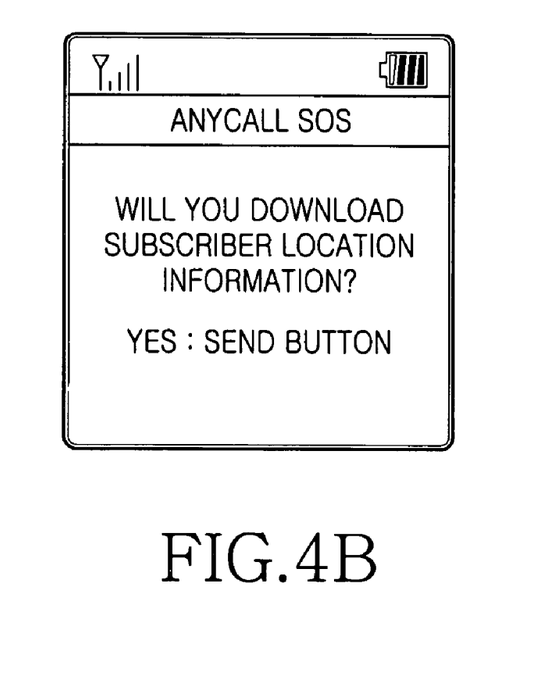

FIGS. 4A and 4B illustrate examples of short messages displayed on a called subscriber terminal when an emergency call is made in accordance with a preferred embodiment of the present invention.

FIG. 4A illustrates an example of the second emergency message displayed on a screen of the called terminal 530 after the calling terminal 510 generates and sends an emergency message. When the called subscriber identifies the second emergency message and presses the SEND button, a voice call is sent to the calling terminal 510. An emergency notification message included in the second emergency message, for example, a message "THIS IS AN EMERGENCY. PLEASE HELP ME!", may be input by the user and may be initially stored in the terminal.

Content of the second emergency message may be, for example, "[ANYCALL SOS]//THIS IS AN EMERGENCY.//PLEASE HELP ME!//BS ID-00000".In this case, the BS identification information is a value stored in advance so that the mobile communication terminal can communicate with the BS. When the serving BS for the terminal is changed, the BS identification information stored in the terminal is also changed. The called terminal 530 can roughly identify the location of the calling subscriber using the BS identification information.

FIG. 4B illustrates an example of a short message created by the management server 540, displayed on a screen of the called terminal 530. When the called subscriber identifies the short message and presses the SEND button, the called terminal 530 is automatically connected to the management server 540 by a URL transferred through the short message. When the called terminal 530 is connected to the management server 540, the called subscriber can download the subscriber's location from the management server 540.

Figure 5:
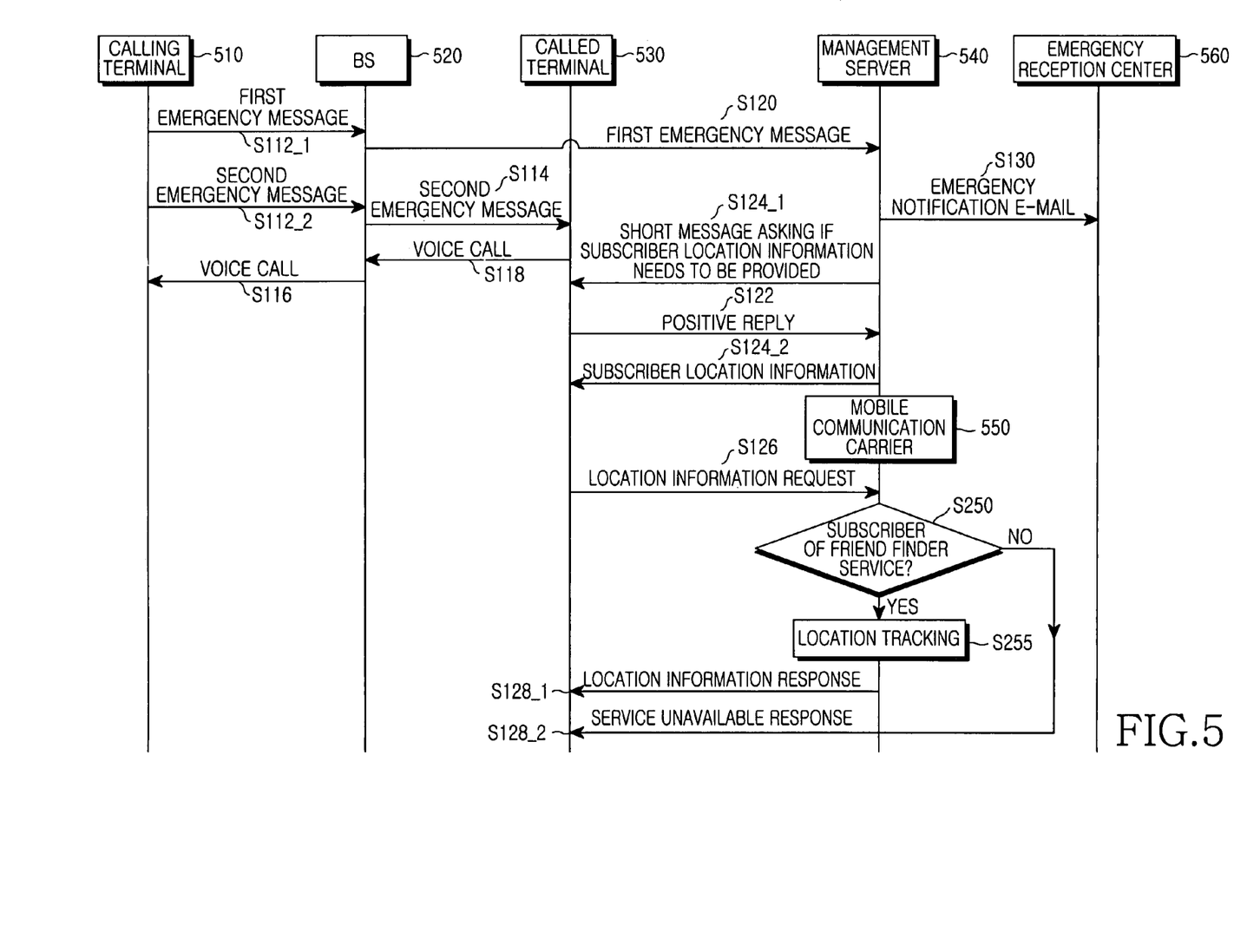
FIG. 5 is a ladder diagram illustrating an emergency call control method in accordance with a preferred embodiment of the present invention.

FIG. 5 is a ladder diagram illustrating an emergency call control method in accordance with a preferred embodiment of the present invention. For simplicity's sake and to provide a better understanding of the present invention, reference numerals Sxxx in FIG. 5 correspond to reference numerals denoting the operations illustrated in FIG. 1.

First, a process for generating emergency messages and transferring the generated emergency messages to recipients (of the called terminal and the management server) will be described in detail.

When the calling terminal 510 sends a first emergency message to the BS 520 in step S112_1, the BS 520 transfers the first emergency message to the management server 540 in step S120. Subsequently, when the calling terminal 510 sends a second emergency message to the BS 520 in step S112_2, the BS 520 transfers the second emergency message to the called terminal 530 in step S114.

The emergency messages are divided into the first emergency message for the management server 540 and the second emergency message for the other recipients designated by the user. The first emergency message includes an emergency notification message, a phone number of at least one called terminal (recipient), a subscriber's phone number, a management server registration ID, and BS identification information. The second emergency message includes the emergency notification message, the subscriber's phone number, and the BS identification information.

Preferably, the emergency message is transmitted in the idle mode of the mobile communication terminal. When the emergency message is transmitted, a recipient list stored in the memory 39 is referred to, and the message is transmitted in the order in which the phone numbers are stored. The emergency message is first sent to the management server 540. Subsequently, the emergency message is sequentially sent to the recipients designated by the user.

If an error occurs during transmission, preferably, re-transmission is not performed, but rather, the message is transmitted to the next recipient. After the message is transmitted to all recipient phone numbers stored in advance, it is re-transmitted to those recipients for which the transmission failed. For example, ten recipient phone numbers (=1 management server phone number +9 called terminal phone numbers) can be stored in FIG. 3C. When the number of message transmissions to a corresponding recipient, that is, the number of calls, is set to two as illustrated in FIG. 3E, a corresponding emergency message is re-transmitted to the corresponding recipient after being transmitted once, for a total of two attempts.

The calling terminal 510 can be slightly vibrated at the start of emergency message transmission. Through this vibrate mode, the user is notified that the transmission operation has been accurately performed. This vibrate mode is an option.

Because the emergency message is processed differently from a general message, the calling terminal 510 attaches a special character code to the emergency message when created so that the emergency message can be easily distinguished and identified. So when the called terminal 530 detects the special character code it knows the received message is an emergency message. In this case, the called terminal 530 generates a ring sound for notification of the received emergency message at the maximum volume, regardless of the preset method for notification of a text message. It is preferred that the emergency message reception notification sound is different from that for conventional text message reception. The notification sound for emergency message reception is herein referred to as an emergency ring sound. When the emergency message is received, the emergency ring sound is generated once or at 2-minute intervals according to a set notification interval.

Alternatively, when the emergency message is received while the called terminal 530 is in another call, the emergency ring sound for notification of the emergency message reception may be output at a low volume, but still independent of the set notification mode. As a further alternative, when the emergency message is received while a browser, modem communication, or supplementary service is in progress, an icon may be displayed on the display unit 35 simultaneously with the emergency ring sound.

When the calling terminal 510 detects an external call connection request in the emergency mode, it identifies the phone number of the caller. If the caller is an emergency message recipient, the calling terminal 510 is immediately connected to a call. However, if the caller is not an emergency message recipient, the call is rejected. In this case, the calling terminal 510 may transmit a message indicating that an official police/fire agency should be notified of the fact that the user is in an emergency situation, via an automatic answering function.

Next, the process performed after the management server 540 is notified of the emergency situation will be described.

In step S130, the management server 540 transmits an emergency notification message, and subscriber location information to the emergency reception center 560, that is, a government agency such as the police or fire department, etc. The location information can use map data or an automatic answering message. Subsequently, the management server 540 extracts a called terminal phone number included in the first emergency message and transmits a short message asking if subscriber location information needs to be provided in step S124_1.

If the recipient has already received the second emergency message from the calling subscriber, but cannot identify an accurate location of the calling subscriber, the message from the management server 540 provides server URL information necessary to identify the subscriber location information generated thereby, so that the recipient terminal is quickly connected to the server 540 using the URL information to receive the subscriber location information.

When a positive response is received from the recipient, for example, when the SEND button is pressed, in step S122, the management server 540 provides the recipient with the subscriber location in step S124_2. In this case, the method for providing the subscriber location information can utilize a map file or automatic answering message, etc.

Because the first emergency message includes a server registration ID, the management server 540 identifies the server registration ID upon receipt of the first emergency message, and retrieves a corresponding database according to the identified server registration ID to identify the calling subscriber.

An E-mail transmitted from the management server 540 to the emergency reception center 560 can include the subscriber location information. Because the first emergency message includes the BS identification information, the management server 540 identifies the BS identification information upon receipt and accurately tracks the subscriber's location using the found BS identification information. The BS identification information is a number for identifying the BS communicating with the mobile communication terminal.

To find a geographic location using the BS identification information, a database (not shown) is used that includes geographic information of an area in which the BS is installed, information of a communication area covered by the BS, and the BS identification information. The database can be included in the management server 540, or, the management server 540 can track an accurate location of the calling subscriber (serving as an emergency message sender) with just the BS identification information from a database of the mobile communication carrier 550.

Alternatively, the recipient may directly request that the management server 540 provide sender location information to receive a reply to the request, instead of performing steps S124_1, S122, and S124_2.

Next, the process between the called terminal 530 and the mobile communication carrier 550 will be described.

A person receiving the emergency message can make a sender location information request to a mobile communication carrier using the person's own terminal. That is, the called subscriber requests the location of the calling subscriber by a voice or text message to the mobile communication carrier 550 using the subscriber's own terminal 530 in step S126. The mobile communication carrier 550 receiving the request determines if the calling subscriber has subscribed for a friend finder service or location-based service of the mobile communication carrier 550 in step S250. If the calling subscriber has subscribed for such a service, the mobile communication carrier 550 tracks a current location of the calling subscriber in step S255. However, if the calling subscriber has not subscribed for the friend finder service or location-based service, the mobile communication carrier 550 sends a service unavailable response in step S128_2.

Now, the process between the called terminal 530 and the calling terminal 510 will be described.

Assuming a person receiving the emergency message wishes to communicate with the message sender, the called terminal 530 issues a voice call request in step S118, and the BS 520 transfers the voice call request to the calling terminal 510 in step S116.

The calling terminal 510 continuously maintains the emergency mode (serving as an emergency call standby state) until the END key is pressed regardless of connection status. Preferably, the process of repeatedly transmitting the emergency message is uninterrupted. When the voice call has been received from the recipient, the calling terminal 510 is automatically connected to the call without generating an alarm ring sound. When the call is automatically connected, a small vibration may be generated. Until the END key is pressed after the emergency message transmission starts, a backlight of the display unit 35 should not operate.

When a transmission failure message is generated while the emergency message is sent to a designated recipient, the message is not re-transmitted to the designated recipient, but is sent to the next recipient. When a text message is received from others rather than the designated recipient in the emergency call standby state, the received message is automatically stored without notification.

Various notifications associated with an alarm/schedule/D-day event are suspended in the emergency mode, to be performed when the emergency mode is terminated.

If the user operates the emergency call button when the mobile communication terminal exits a communication zone, the terminal displays, on an external window, a message indicating that the terminal has exited the communication zone after indicating that the emergency call button has been recognized. When the terminal moves into a service available zone, the emergency message is sent and the user notified.

As apparent from the above description, the present invention can be conveniently used in that a short message for emergency notification and an emergency rescue request is transmitted in a one-touch manner when a user of a mobile communication terminal is in an emergency situation. The emergency message can be simultaneously sent to a plurality of recipients. An emergency call can be made using only a mobile communication terminal regardless of service subscription or a type of service of a mobile communication carrier. An emergency situation of a user can be accurately and safely identified through the surrounding sound when a communication path is connected with a recipient even when the user cannot talk. The emergency call is automatically linked to a government agency such as the police or fire department, etc. through a management server for managing the emergency situation, to notify the authorities so that the user can be easily rescued.

Although preferred embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. An emergency call system comprising: a calling terminal including a controller configured to simultaneously generate and transmit a first mobile communication emergency message including an emergency notification message, a phone number of at least one called terminal (recipient) and Base Station (BS) identification information, and a second emergency message including the emergency notification message and a subscriber's phone number; a BS configured to receive the first and second emergency messages, and transfer the received first and second emergency messages to a management server with a predetermined phone number and the at least one called terminal, respectively; and the management server configured to receive the first emergency message from the BS according to the predetermined phone number, compute a location of the calling terminal based on the BS identification information included in the first emergency message, generate subscriber location information using the computed location of the calling terminal, notify the at least one called terminal and an emergency reception center of the subscriber location information, and transmit the subscriber location information to the at least one called terminal requesting the subscriber location information.

2. The emergency call system according to claim 1, wherein the calling terminal further includes an emergency call key and a memory, and transmits the first and second emergency messages in response to an input of the emergency call key, the memory storing the emergency notification message, management server registration identification (ID), the at least one called terminal's phone number, and the BS identification information.

3. The emergency call system according to claim 1, wherein the management server provides voice guidance, when detecting a request for location information of the calling subscriber from the at least one called terminal.

4. The emergency call system according to claim 1, wherein the management server computes a location of the calling terminal according to the BS identification information to make a mark on a map when detecting a location information request from at least the called terminal, and transmits, to the at least one called terminal, a uniform resource locator (URL) to download the map.

5. The emergency call system according to claim 1, wherein the management server transmits emergency notification information to the emergency reception center.

6. The emergency call system according to claim 5, wherein the emergency notification information includes the subscriber location information.

7. The emergency call system according to claim 1, wherein the calling terminal distinguishes emergency rescue mode or designated call mode, operates according to the emergency rescue mode or the designated call mode, and transmits the first emergency message to the management server in the emergency rescue mode.

8. The emergency call system according to claim 1, wherein the calling terminal is switched to emergency mode after transmitting the first and second emergency messages, and wherein the calling terminal is configured to operate a microphone when the at least one called terminal transmits a voice call, such that emergency information is transferred to the at least one called terminal through a sound signal from the microphone.

9. The emergency call system according to claim 1, wherein the first or second emergency message further includes a management server registration ID of the subscriber.

10. A method for controlling an emergency call in an emergency call system including a calling terminal, at least one called terminal, a management server for notifying an emergency reception center of an emergency situation of a registered subscriber, and a base station (BS), comprising:
determining call mode by the calling terminal;
simultaneously generating first and second emergency mobile communication messages in emergency rescue mode by the calling terminal, and generating the second emergency message in designated call mode made by the calling terminal;
transmitting the first emergency messages to the management server with a predetermined phone number and second emergency messages to the at least one called terminal in the emergency rescue mode by the calling terminal;
transmitting the second emergency message to the at least one called terminal in the designated call mode by the calling terminal;
transmitting a request for subscriber location information from the at least one called terminal to the management server when the at least one called terminal receives the second emergency message to the management server by the at least one called terminal after receiving the second emergency message;
computing the subscriber location based on BS identification information by the management server; and
receiving the subscriber location information to the at least one called terminal by the management server.

11. The method according to claim 10, wherein the emergency rescue mode or the designated call mode is decided by a user when an emergency call function is set and registered in the calling terminal.

12. The method according to claim 10, wherein the first emergency message includes an emergency notification message, a phone number of the at least one called terminal (recipient) and the BS identification information, and wherein the second emergency message includes the emergency notification message and the subscriber's phone number.

13. The method according to claim 12, wherein the first or second emergency message further includes a management server registration identification (ID) of the subscriber.

14. The method according to claim 10, wherein the management server transmits emergency notification information to the emergency reception center when receiving the first emergency message.

15. The method according to claim 10, further comprising:
transmitting, by the management server, a message asking if the at least one called terminal desires to receive the subscriber location information after receiving the first emergency message; and providing, by the management server, the subscriber location information when a reply from the at least one called terminal is received.

16. The method according to claim 10, wherein the first emergency message is transmitted before the second emergency message.

17. The method according to claim 10, further comprising:
setting and registering an emergency call function, and wherein registering comprises:
registering at least one emergency message recipient to which the emergency message is transmitted by a user of the calling terminal, content of the emergency message, and the number of emergency message transmissions.

18. The method according to claim 11, further comprising:
setting and registering an emergency call function, wherein the registering step comprises:
registering at least one emergency message recipient to which the emergency message is transmitted by a user of the calling terminal, content of the emergency message, and the number of emergency message transmissions.

19. The method according to claim 17, wherein registering the at least one emergency message recipient comprises:
retrieving a phone number stored in advance and registering a predetermined phone number selected by the user.

20. The method according to claim 17, wherein registering the at least one emergency message recipient is performed by a direct recording from the user.

21. The method according to claim 17, wherein registering the emergency message content comprises:
retrieving emergency message content stored in advance and registering predetermined emergency message content selected by the user.

22. The method according to claim 17, wherein registering the emergency message content is performed by a direct recording from the user.

23. The method according to claim 10, further comprising:
determining a caller when an incoming call is detected in emergency call standby mode;
automatically connecting the call without making incoming call notification when the incoming call is received from an emergency message recipient; and
rejecting the call when the incoming call is received from a different caller rather than the emergency message recipient, and transmitting, to the caller, an automatic answering message for notification of an emergency situation of a user.

* * * * *